United States Patent
Borg et al.

(10) Patent No.: US 8,393,640 B2
(45) Date of Patent: Mar. 12, 2013

(54) GAS GENERATOR FOR MOTOR VEHICLE SAFETY AIRBAG

(75) Inventors: Evrard Borg, Pessac (FR); Eric Laspesa, Alten des Paluds (FR); Jean-Paul Nadeau, Ollioules (FR)

(73) Assignee: Herakles, Le Haillan (FR)

( * ) Notice: Subject to any disclaimer, the term of this patent is extended or adjusted under 35 U.S.C. 154(b) by 0 days.

(21) Appl. No.: 13/259,448

(22) PCT Filed: Mar. 26, 2010

(86) PCT No.: PCT/FR2010/050558
§ 371 (c)(1),
(2), (4) Date: Oct. 27, 2011

(87) PCT Pub. No.: WO2010/109153
PCT Pub. Date: Sep. 30, 2010

(65) Prior Publication Data
US 2012/0038139 A1 Feb. 16, 2012

(30) Foreign Application Priority Data
Mar. 27, 2009 (FR) ...................................... 09 01487

(51) Int. Cl.
*B60R 21/26* (2011.01)
(52) U.S. Cl. ............................ 280/736; 280/741; 701/45
(58) Field of Classification Search .................. 280/735, 280/736, 741, 742; 102/530; 701/45
See application file for complete search history.

(56) References Cited

U.S. PATENT DOCUMENTS

| | | | |
|---|---|---|---|
| 3,861,710 A * | 1/1975 | Okubo | 280/735 |
| 6,237,940 B1 * | 5/2001 | Shirk et al. | 280/730.2 |
| 6,314,889 B1 * | 11/2001 | Smith | 102/530 |
| 6,412,814 B1 * | 7/2002 | Huber et al. | 280/736 |
| 7,347,449 B2 * | 3/2008 | Rossbach et al. | 280/737 |
| 7,690,680 B2 * | 4/2010 | Meissner et al. | 280/736 |
| 7,878,535 B2 * | 2/2011 | Rose et al. | 280/736 |
| 7,900,959 B2 * | 3/2011 | Bito | 280/737 |
| 7,963,555 B2 * | 6/2011 | Kalliske et al. | 280/736 |
| 2003/0025313 A1 * | 2/2003 | Sawa et al. | 280/741 |
| 2005/0161922 A1 | 7/2005 | Bilbrey et al. | |
| 2007/0029762 A1 * | 2/2007 | Katsuda et al. | 280/728.2 |

FOREIGN PATENT DOCUMENTS
WO WO2005/110818 11/2005

* cited by examiner

*Primary Examiner* — Joseph Rocca
*Assistant Examiner* — Timothy Wilhelm
(74) *Attorney, Agent, or Firm* — Hamre, Schumann, Mueller & Larson, P.C.

(57) ABSTRACT

The invention relates to a pyrotechnic gas generator (10) for a car airbag (12), the generator including a pyrotechnic charge and a pyrotechnic initiator (28) situated in a combustion chamber (14) and suitable for being actuated by a first detection system (30) for detecting an imminent collision state and/or by a second detection system (32) for detecting an actual collision state. The pyrotechnic gas generator of the invention further includes a gas flow passage (16, 18) between said combustion chamber (14) and said airbag (12), and at least one valve (34) suitable for being moved from a first position in which it defines a first flow section to a second position in which it defines a second flow section greater than said first flow section, or vice versa. In particular, the valve (34) is arranged in such a manner as to define a greater flow section when the pyrotechnic initiator (28) is actuated by the first detection system (30).

11 Claims, 7 Drawing Sheets

GAS GENERATOR FOR MOTOR VEHICLE SAFETY AIRBAG

The invention relates to a pyrotechnic gas generator including a pyrotechnic charge and for use in inflating a car airbag. More particularly, the invention relates to a pyrotechnic gas generator having two operating rates, suitable for being triggered by a command prior to an impact or by a command at the moment of impact.

Over the last twenty years, the automobile industry has developed airbag systems for protecting the passengers of vehicles in the event of a collision. Such airbags are generally deployed by means of hot gas delivered by a pyrotechnic gas generator. In the event of a collision, the airbag must deploy quickly and must remain inflated for a sufficient length of time after the impact. Pyrotechnic gas generators are thus designed to operate in a time period that is very short, of the order of a few tens of milliseconds.

Nowadays most vehicles are fitted with airbag-type safety systems, most of which are triggered at the moment when a vehicle actually makes contact with an obstacle, i.e. in the event of an actual collision.

Such triggering is achieved by means of accelerometers placed on the structure of the vehicle (shields, side parts), that serve to inform an electronic control unit about an accident. After verification and feedback, the control unit sends an electric trigger signal to the pyrotechnic systems of the airbag.

The systems must then deploy in a very short length of time, and the airbags necessarily inflate suddenly (about 50 liters to 100 liters in about 30 milliseconds to 40 milliseconds) which can be harmful to the occupants if they are poorly positioned inside the vehicle.

Recently, novel detection systems based on contactless detectors (video cameras, infrared or microwave sensors, etc.) make it possible to anticipate a collision. In association with computer signal processing, such detection systems make it possible in reliable manner to evaluate that a collision is imminent. In the present state of the art it is estimated that such detection systems are suitable for actuating safety systems, without risk of error, about 100 milliseconds before a collision. By enabling various safety systems to be triggered, and in particular one or more airbags, at an earlier instant than possible with the above-described conventional systems, these novel detection systems enable airbags to be inflated over a length of time that is longer, about 150 milliseconds, thus making it possible for them to operate less suddenly and thereby reducing risks for passengers who are poorly positioned inside the vehicle at the moment of impact.

Nevertheless, those novel systems for detecting an imminent collision are not yet mature, so car manufacturers at present desire to have dual pyrotechnic systems available that are capable of operating differently depending on the type of detection: in conventional manner in the event of an actual collision being detected, with airbags then being inflated fast, e.g. in about 30 milliseconds to 40 milliseconds, or else "slowly" in the event of an imminent collision being detected, in which case the duration of inflation may be closer to 120 milliseconds to 150 milliseconds.

The control unit selects the appropriate mode of operation depending on the type of detection and on the information transmitted thereto by the various sensors.

Technical solutions have already been proposed for controlling pressure inside car airbags. For example, patents U.S. Pat. No. 5,234,229 and EP 1 661 766 relates to airbags fitted with pyrotechnic gas generators that enable vents to be controlled in order to divert gas away from the airbag. In such systems, a "leak" from the combustion chamber is adjusted depending on the desired mode of operation. That does not involve controlling the pyrotechnic gas generator itself as a function of the moment when the collision is detected.

An object of the present invention is thus to provide a pyrotechnic gas generator that is capable of adapting the speed with which it inflates a motor vehicle airbag depending on whether a detection system has detected an imminent collision or an actual collision.

More particularly, the present invention provides a pyrotechnic gas generator for a car airbag, the generator including a pyrotechnic charge and being characterized in that it further comprises:
  a pyrotechnic initiator situated in a combustion chamber and suitable for being actuated by a first detection system for detecting an imminent collision state, and/or by a second detection system for detecting an actual collision state;
  a gas flow passage between said combustion chamber and said airbag; and
  at least one valve suitable for being moved from a first position in which it defines a first flow section to a second position in which it defines a second flow section greater than said first flow section, or vice versa, said valve being arranged in such a manner as to define the greater flow section if the pyrotechnic initiator is actuated by the first detection system.

The speed of inflation of the car airbag increases when the flow rate of gas leaving the combustion chamber of the gas generator is large. The flow rate depends on the pressure that exists inside the combustion chamber, which pressure is a function of the area of the gas flow passage from the combustion chamber to the inside of the airbag and of the combustion surface area of the pyrotechnic charge. In order to adjust the gas flow rate leaving the combustion chamber, the present invention proposes varying the gas flow section from the combustion chamber to the inside of the airbag by means of a movable valve. Thus, depending on the type of collision detection (anticipated or otherwise), it is possible to define a first flow section enabling the airbag to be inflated "slowly" or a second flow section enabling it to be inflated "fast". When a collision is detected by a system for detecting an imminent collision, the gas generator is triggered by a command prior to the impact and the gas flow section is adjusted so that inflation can take place "slowly" and gently, taking advantage of the extra time made available by anticipating the impact in comparison with conventional detection systems. In other words, if the pyrotechnic initiator is actuated by a system for detecting an imminent collision state, then the valve is arranged to define a larger flow section. On the contrary, if the collision detected by a detection system is an actual collision, then the gas flow section is adjusted so that the airbag inflates fast enough for the passengers of the vehicle to be protected during and after the impact. In other words, if the pyrotechnic initiator is actuated by a system for detecting an actual collision, the valve is arranged so as to define a smaller flow section.

The pyrotechnic charge incorporated in the pyrotechnic gas generator of the present invention needs to be adapted to "slow" or "fast" combustion depending on the type of collision detection (anticipated or otherwise). Patent application FR 2 915 746 A1 describes a pyrotechnic charge composition adapted to those two modes of operation.

The gas flow passage may, for example be constituted by at least two orifices formed in the combustion chamber, said valve being suitable for closing at least one of said orifices.

The valve may, for example, be moved from its first position to its second position, or vice versa, under the effect of the gas released by a pyrotechnic charge ignited by a pyrotechnic actuation initiator.

By way of example, the valve may be a slider suitable for being moved along a rectilinear path. The valve may also be a turnable slider having at least one opening suitable for being positioned in register with at least one orifice of the combustion chamber and at least one guide ramp, said turnable slider being suitable for being moved under the effect of a piston actuated by the gas released by a pyrotechnic charge ignited by the pyrotechnic actuation initiator and co-operating with said guide ramp. The valve may also be in the form of a valve needle.

In another embodiment of the invention, said valve is biased by a spring that is initially stressed and that is released by an inertial device that is activated as from a detection threshold.

In another embodiment, said valve is biased by a spring that is initially stressed and that is released by a thermal fuse connected to an electric circuit.

In yet another embodiment, said valve is biased by a spring that is initially stressed and that is released by an electromagnetic trigger.

The present invention also provides the combination of a car airbag together with a pyrotechnic gas generator as described above that is connected to said airbag.

The present invention also provides a safety system for inflating a car airbag, the system comprising a pyrotechnic gas generator as described above, a first detection system for detecting an imminent collision state, and a second detection system for detecting an actual collision state.

The invention can be well understood and its advantages appear better on reading the following detailed description of an embodiment given by way of non-limiting example. The description refers to the accompanying drawings, in which.

Figure 1A:
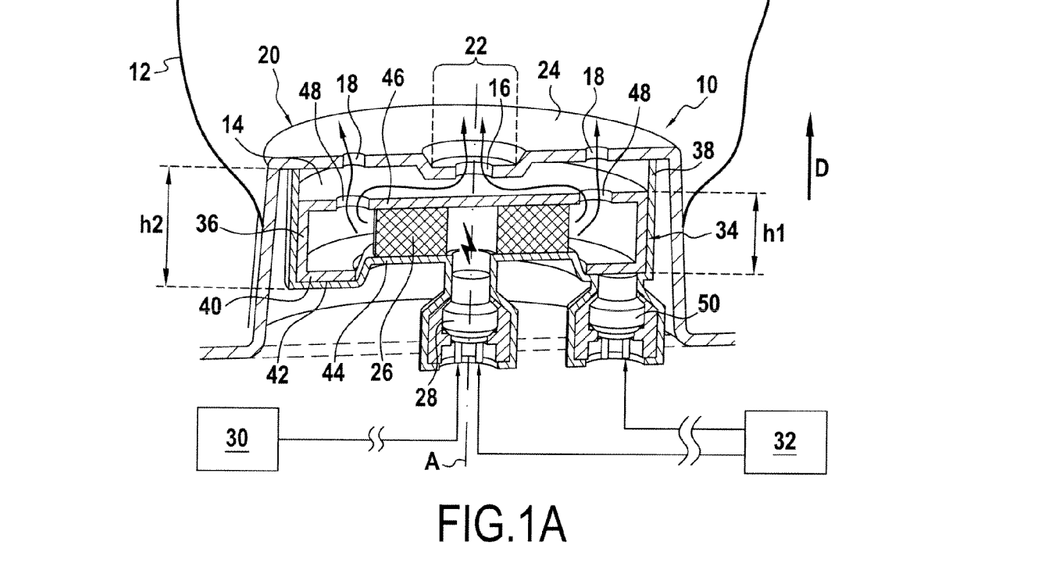
FIGS. 1A and 1B show a first embodiment of a gas generator of the present invention.
Figure 1B:
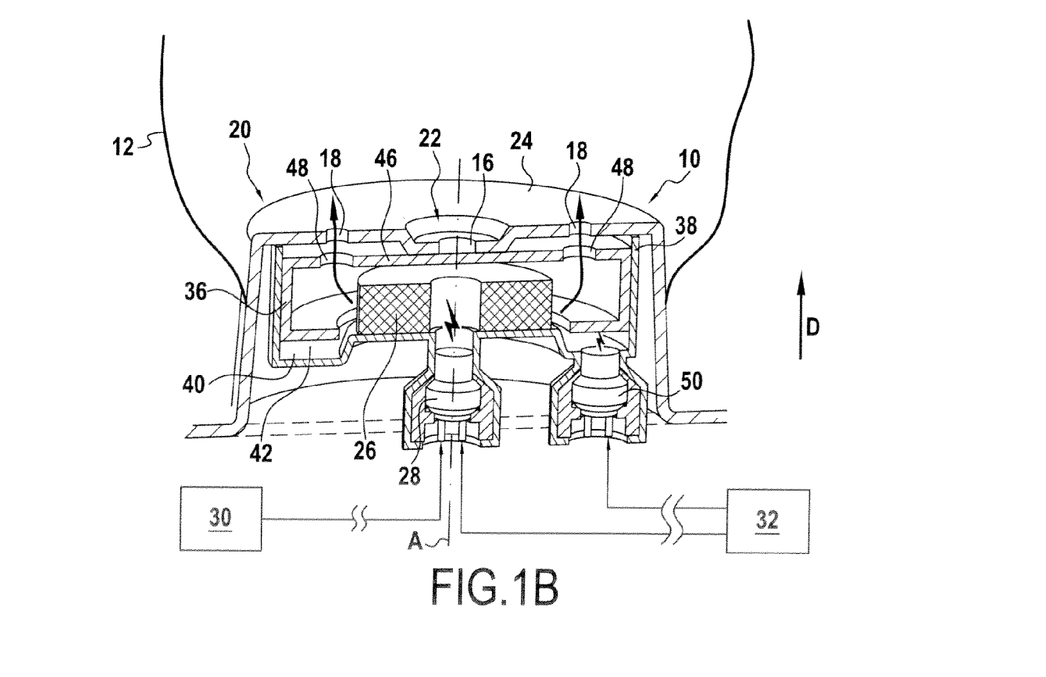

In FIGS. 1A and 1B there can be seen a pyrotechnic gas generator 10 for inflating a car airbag 12. The gas generator 10 comprises a combustion chamber 14 in communication with the inside of the airbag 12 via a plurality of orifices 16, 18 constituting a gas flow passage.

Throughout the description below, the outward axial direction of the gas generator 10 is defined as being the direction in which the airbag 12 inflates when it is inflated under the effect of gas coming from the combustion chamber 14 (this direction is represented by arrow D in FIG. 1A). Conversely, the inward axial direction is defined as being the direction pointing towards the structure in which the gas generator is mounted (e.g. a dashboard).

"Fast" inflation and "slow" inflation of the airbag are likewise defined as follows: it is considered that the inflation of the airbag 12 is "slow" when it begins as soon as an imminent collision is detected. At this moment, an impact has not yet occurred. Inflation is therefore performed more gently, taking best advantage of the extra time available due to anticipating the collision. In contrast, it is considered that airbag inflation is fast when inflation begins after an actual collision has been detected.

In the embodiment shown, the combustion chamber 14 is annular, of axis A. The outer axial end wall 20 of the combustion chamber 14 that faces the airbag 12 comprises a central portion 22 surrounded by a peripheral portion 24. The central portion 22 occupies a plane perpendicular to the axis A of the combustion chamber 14 and is set back a little towards the inside of the gas generator 10 relative to the peripheral portion 24. In the embodiment shown, the peripheral and central portions of the outer axial end wall 20 are mutually parallel. As a variant, it is possible, for example, for the peripheral portion 24 of the end wall 20 of the combustion chamber to present a shape that is substantially conical, flaring from the central portion 22 towards the outside of the gas generator 10.

In the gas generator shown in FIGS. 1A and 1B, two diametrically opposite orifices 18 are provided in the peripheral portion 24, and one orifice 16 is formed in the central portion 22. In a variant, a plurality of orifices could be provided that are distributed circumferentially around the peripheral portion 24 of the outer axial end wall 20 of the combustion chamber 14. Provision could also be made for a plurality of orifices to be distributed over the central portion 22 of the combustion chamber 14.

The combustion chamber 14 contains a pyrotechnic charge 26, e.g. a block of solid propellant or a pelleted charge. The pyrotechnic charge 26 is suitable for being ignited under the effect of a pyrotechnic initiator 28 situated in the combustion chamber 14.

As shown in FIG. 1A, the pyrotechnic initiator 28 is connected to two collision detector systems 30 and 32, and it is suitable for being triggered by whichever one of those two systems operates first. Throughout the description below, the first detection system 30 serves to detect an imminent collision by contactless detectors of the video camera or infrared sensor type, while the second detection system 32 serves to detect an actual collision. By way of example, accelerometers (not shown) may be provided on the structure of the vehicle. These inform an electronic control unit of the collision and it sends a triggering electrical signal 28 to the pyrotechnic initiator.

As shown in FIG. 1A, the gas generator 10 includes at least one valve-forming slider 34 placed in the combustion chamber 14 and suitable for moving inside it along a rectilinear path, in particular along the axis A. For this purpose, the slider 34 comprises a skirt 36 of height h1 that is less than the height h2 of the combustion chamber 14 and that is suitable for sliding along the radial wall 38 of the combustion chamber 14. At its inner axial end, the skirt 36 of the slider 34 includes an annular margin 40 that is folded towards the inside of the slider 34 through 90°. As shown in FIG. 1A, this annular margin 40 is suitable for being received in an annular groove 42 of complementary shape formed in the inner axial end wall 44 of the combustion chamber 14.

By means of the above arrangements, the slider 34 is capable of moving around the pyrotechnic charge 26 between a first position as shown in FIG. 1A in which the slider 34 bears against the inner axial end wall 44 of the combustion chamber 14, and a second position shown in FIG. 1B, in which the slider 34 comes to bear against the central portion 22 of the outer axial end wall 20 of the combustion chamber 14, thereby closing the orifice 16 provided in said central portion 22. Whatever the position of the slider 34 inside the combustion chamber 14, the flow of gas coming from the pyrotechnic charge 26 and going towards the outside of the slider 34 and then towards the inside of the airbag 12 takes place via openings 48 provided in the outer axial wall 46 of the slider 34. Advantageously, these openings 48 are situated facing the orifices 18 in the peripheral portion 24 of the outer axial face 20 of the combustion chamber 14. On reading the description below, it can be understood that the openings 48 should not be situated in register with the central portion 22. When the slider 34 is in its first position, the orifices 16 and 18 in the outer face 20 of the combustion chamber 14 together form a first flow section. When the slider 34 is in its second position, a second flow section that is smaller than the first flow section is defined by the orifices 18 alone, which orifices are formed in the peripheral portion 24 of the outer face 20 of the combustion chamber 14.

The mass flow rate from a solid propellant block or from a pelleted charge increases with increasing pressure P existing in the combustion chamber 14, where the pressure P is a function of the ratio of the area of the gas exhaust orifices 16, 18 to the surface area in combustion of the solid propellant block or of the pelleted charge. For a given solid propellant block placed in the combustion chamber 14, the gas flow rate towards the airbag 12 is thus greater when the gas flow section is smaller, since the pressure P inside the combustion chamber 14 is then greater. Consequently, the airbag 12 is inflated more quickly when the safety slider 34 is in its second position than when the slider 34 is in its first position.

FIG. 1A shows the pyrotechnic gas generator 10 in its initial state. The slider 34 is in its first position, the gas flow section between the combustion chamber 14 and the airbag 12 is at its maximum.

As mentioned above, the pyrotechnic initiator 28 is connected to both of the first and second detection systems 30 and 32. When it is the first detection system 30 that operates first, i.e. if an imminent collision is detected in anticipated manner, then the pyrotechnic initiator 28 ignites the pyrotechnic charge 26 prior to the impact, and the airbag 12 is inflated "slowly" under the effect of the gas that is produced escaping through the plurality of orifices 16 and 18 of the combustion chamber 14.

Consideration is given here to the situation in which the first detection system 30 has not operated. The more-reliable, second detection system 32 detects the collision at the moment of impact, and it immediately actuates the pyrotechnic initiator 28 that ignites the pyrotechnic charge 26. At this instant, if the gas generator 10 were to remain in its initial state (FIG. 1A), then the flow rate of gas escaping from the combustion chamber 14 would be too small and would not enable the airbag 12 to be fully inflated in time. The airbag 12 would not be inflated sufficiently to protect the vehicle passengers against the violence of the impact.

Consequently, the gas generator 10 of the present invention provides for the valve-forming slider 34 to be capable of being moved from its first position (FIG. 1A) towards its second position (FIG. 1B) when an actual collision is detected by the second detection system 32. For this purpose, a pyrotechnic actuation initiator 50 that is connected to the second detection system 32 and that is suitable for being actuated solely thereby is placed on the inside of the combustion chamber 14. When the pyrotechnic actuation initiator 50 is actuated, it releases gas into the chamber formed by the annular groove 42 of the combustion chamber 14 and the annular margin 40 of the slider 34. By exerting a force on the annular margin 40, this gas drives the slider 34 from its first position towards its second position. In this second position, the gas flow section that was initially constituted by all of the orifices 16 and 18 of the combustion chamber taken together is now reduced (by the section of the orifice 16 in the central portion 22), such that the gas flow rate leaving the combustion chamber 14 is greater. When an actual collision is detected, the gas generator 10 thus ensures that the airbag 12 is inflated "fast", thereby protecting the vehicle passengers.

Provision could also be made for the pyrotechnic actuation initiator 50 to be triggered by the second detection system 32 even if the first detection system 30 has correctly operated beforehand. In this way, the inflation of the airbag 12 takes place in two stages, "slowly" until the second detection system 32 operates, and faster thereafter.

Figure 2A:
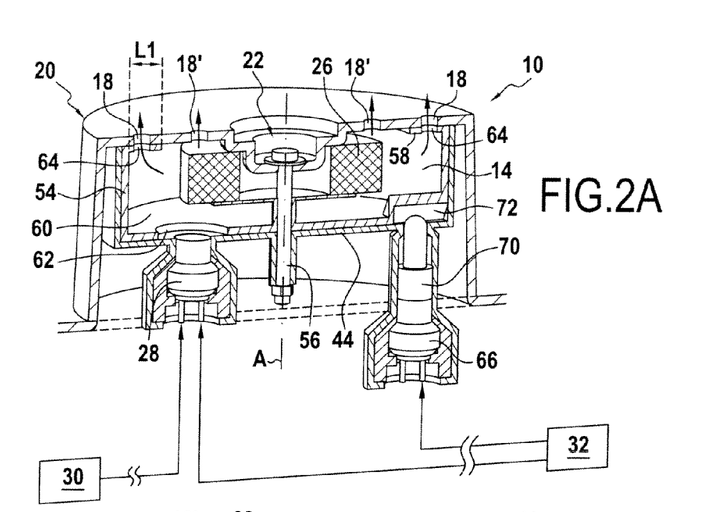
FIGS. 2A to 2C show a second embodiment of a gas generator of the present invention.
Figure 2B:
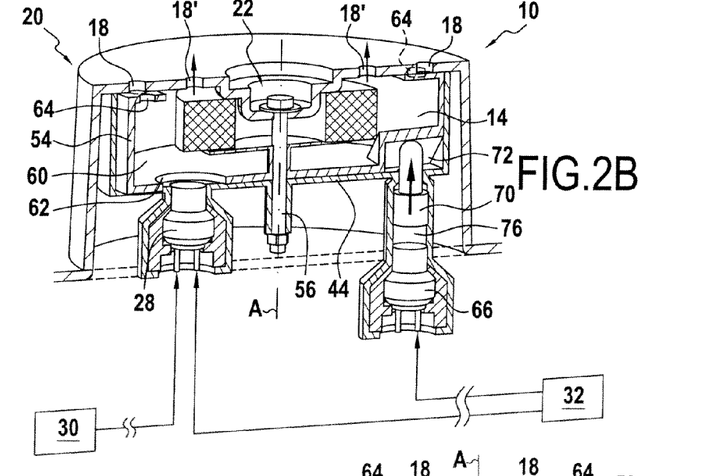
Figure 2C:
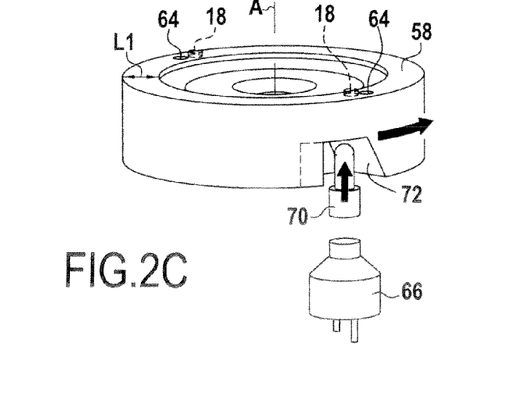

FIGS. 2A to 2C show a gas generator in a second embodiment of the present invention. Numerical references corresponding to elements that are common with the first embodiment remain identical throughout the description below.

In this second embodiment, the combustion chamber 14 has four orifices 18, 18' diametrically distributed in its outer axial end wall 20. Naturally, in other embodiments of the invention, the combustion chamber could have some other number of orifices in some other distribution.

Inside the combustion chamber 14, a valve-forming slider 54 is mounted to turn about an axis 56 extending along the axis A.

In order to cause the slider 54 to turn, the gas generator 10 includes a pyrotechnic actuation initiator 66. In response to a trigger signal sent by a collision detector, the pyrotechnic actuation initiator 66 is suitable for igniting a pyrotechnic charge that releases gas that serves to move a piston 70. As shown in FIG. 2C, the piston 70 is positioned facing a guide ramp 72 of the turntable slider 54. Thus, when the pyrotechnic actuation initiator 66 is triggered, the piston presses against the guide ramp 72 of the slider 54, causing said slider 54 to turn inside the combustion chamber 14.

At its outer axial end, the slider 54 includes an annular margin 58 bearing against the outer axial end wall 20 of the combustion chamber 14. Furthermore, the end wall 60 of the slider 54 bears against the inner axial end wall 44 of the combustion chamber 14. It should be observed that an opening 62 is provided in the end wall 60 of the slider 54 to provide a connection between the pyrotechnic initiator 28 and the pyrotechnic charge 26 situated inside the combustion chamber 14 and surrounded by the slider 54.

The annular margin 58 of the slider 54 has two openings 64, each of which is suitable for being positioned in register with an orifice 18 of the combustion chamber 14. The radial width L1 of the annular margin 58 is designed so that it does not cover the two orifices 18' situated radially closer to the center of the combustion chamber 14.

The orifices 18 in the combustion chamber and the openings 64 in the slider 54 are thus arranged in such a manner that, for the slider 54 being in a first angular position inside the combustion chamber 14, a first gas flow section is defined between the combustion chamber 14 and the airbag 12. In the example described, this first gas flow section is equal to the sum of the sections of all of the orifices 18 and 18' in the combustion chamber 14. The two orifices 18' situated radially towards the center are not in contact with the annular margin 58 and therefore they remain open. The other two orifices 18 situated radially further from the center of the combustion chamber 14 communicate with the openings 64 of the slider 54 and thus also allow gas to flow.

By moving angularly inside the combustion chamber 14, the turnable slider 54 is suitable for taking up a second position in which a second gas flow section is defined that is smaller than the above-defined first gas flow section. When the slider 54 is in its second position, the two orifices 18 in the combustion chamber 14 that are situated in register with the annular margin 58 of the slider 54 are closed by said margin 58, while the other two orifices 18' continue to allow gas to pass from the combustion chamber 14 to the inside of the airbag 12.

FIG. 2A shows the gas generator 10 in its initial state. The slider 54 is in its first angular position such that the gas flow section is at its maximum. As in the first embodiment, the pyrotechnic initiator is connected to both collision detection systems 30 and 32, whereas the pyrotechnic actuation initiator 66 is connected only to the second detection system 32. If the first detection system 30 detects an imminent collision, then the pyrotechnic initiator 28 is triggered and it ignites the pyrotechnic charge 26. The gas flow section remains at its maximum, such that the airbag 12 is inflated "slowly".

In the event of the second detection system 32 operating, it actuates both the pyrotechnic initiator 28 and the pyrotechnic actuation initiator 66. The pyrotechnic actuation initiator 66 then ignites a pyrotechnic charge that releases gas into a piston chamber 76. The piston situated facing the guide ramp 72 of the slider 54 is moved outwards in the axial direction A under the effect of the gas released by the pyrotechnic charge. By virtue of the guide ramp 72, the piston 70 drives the slider 54 over its rotary stroke. The gas flow section is then reduced, thereby increasing the pressure inside the combustion chamber 14, increasing the gas delivery flow rate, and thus increasing the rate of inflation of the airbag 12, which is inflated "fast".

Figure 3A:
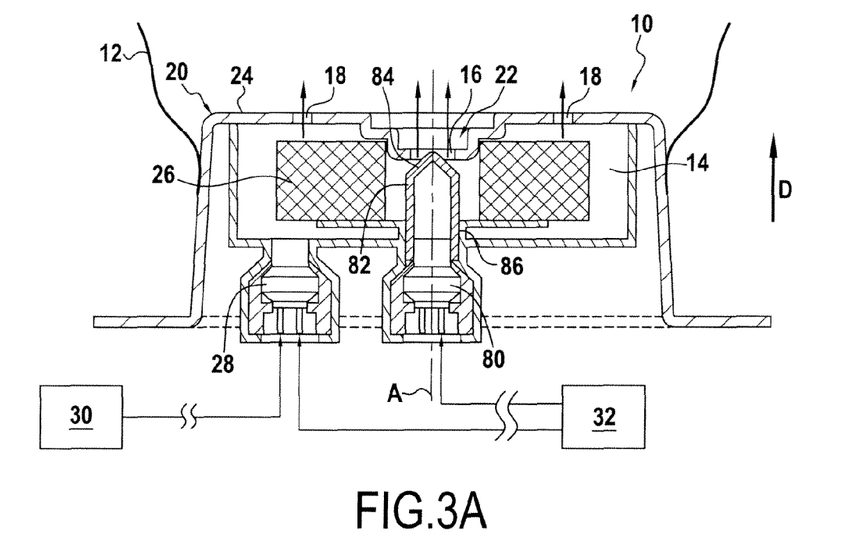
FIGS. 3A and 3B show a third embodiment of a gas generator of the present invention.
Figure 3B:
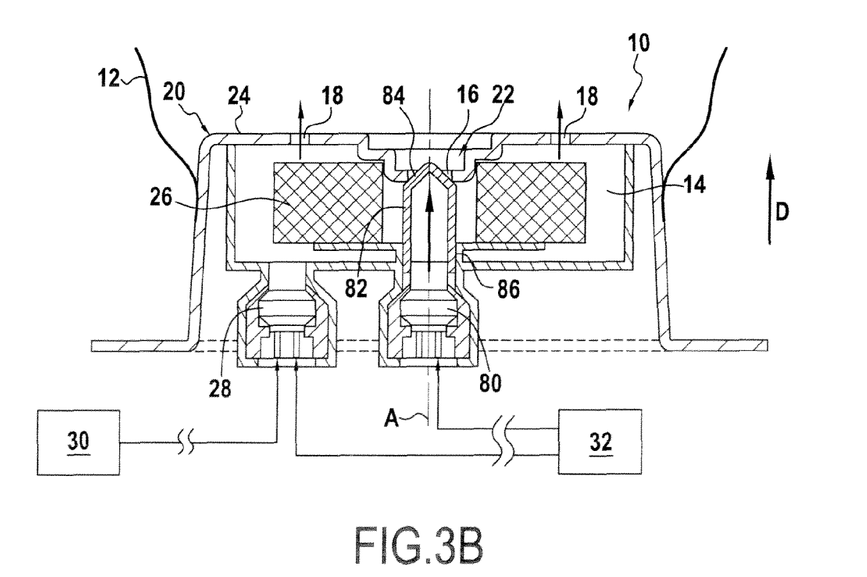

FIGS. 3A and 3B show a third embodiment of the pyrotechnic gas generator of the present invention. As in the two preceding embodiments, the pyrotechnic gas generator 10 includes a pyrotechnic initiator 28 connected to the first and second detection systems 30 and 32 and suitable for being triggered by that one of the two detection systems 30 and 32 that operates first.

As shown in FIG. 3A, and in a manner similar to the first embodiment described with reference to FIGS. 1A and 1B, the combustion chamber 14 includes an outer axial end wall 20 having a peripheral portion 24 in which two outlet orifices 18 are formed, and a central portion 22 in which one gas outlet orifice 16 is formed. Naturally, in other embodiments of the invention, the combustion chamber could have some other number of outlet orifices in some other distribution.

Facing the orifice 16 formed in the central portion 22 of the outer wall 20 of the combustion chamber 14 there is provided a pyrotechnic actuation initiator 80 connected to the second detection system and surmounted by a cylindrical rod 82 that is terminated by a valve-forming needle 84. The cylindrical rod is suitable for sliding in a cylindrical guide bearing surface 86 provided in the combustion chamber 14. By igniting a charge, the pyrotechnic actuation initiator 80 causes gas to be released inside the cylindrical rod 82. Under the effect of the released gas, the rod slides in the guide bearing surface 86 in the axial direction A, outwards from the gas generator 10, so that the needle 84 closes the orifice 16 in the combustion chamber 14.

As in the two above-described embodiments, the gas generator 10 is such that in its initial state all of the orifices 16, 18 in the combustion chamber 14 allow gas to flow towards the airbag 12 and together they define a first gas flow section. The flow section is reduced if the second detection system 32 is actuated. This may happen if the first detection system 30 has not operated correctly, or else if the generator 10 is designed so that the second detection system 32 operates in the event of an impact even when the first detection system 30 has already triggered "slow" inflation of the airbag 12. Under such circumstances, inflation takes place in two stages: a "slow" stage prior to the impact, followed by a "fast" stage after the impact.

Figure 4A:
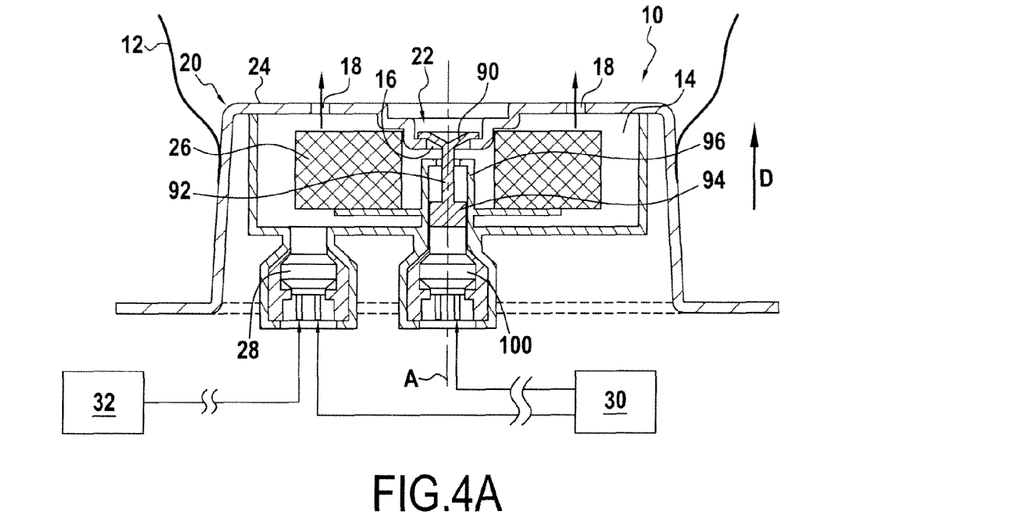
FIGS. 4A and 4B show a fourth embodiment of a gas generator of the present invention.
Figure 4B:
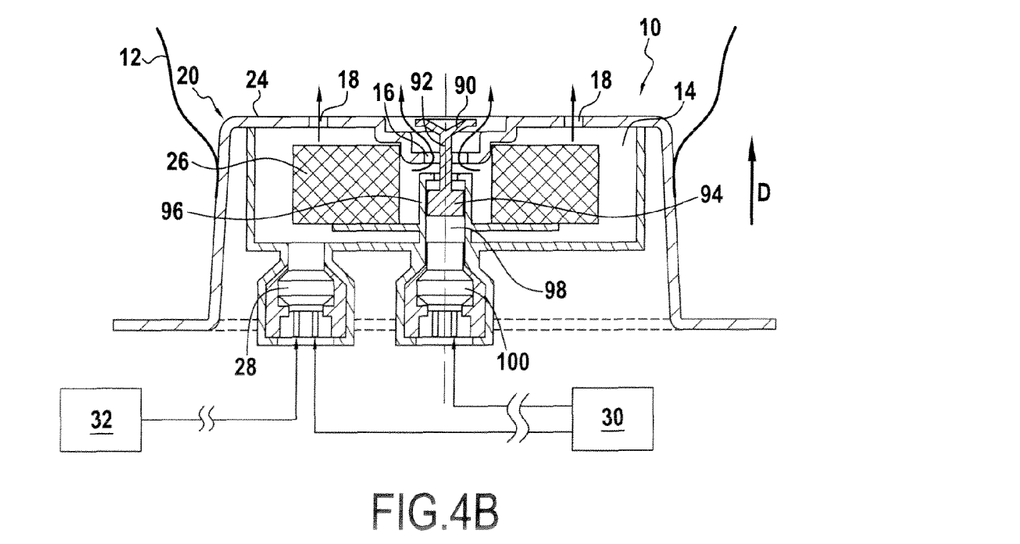

FIGS. 4A and 4B show a fourth embodiment of the invention.

As shown in FIG. 4A, the gas generator 10 includes a valve 90 suitable for bearing against the outer face of the outer end wall 20 of the combustion chamber 14 in order to close the orifice 16 formed in the central portion 22. In a variant, the valve 90 could be designed to close any other orifice provided in the combustion chamber 14.

At its center, the valve 90 is connected to a piston rod 92 passing through the orifice 16 of the combustion chamber 14. This rod 92 is connected to a piston 94 that is suitable for sliding in an annular housing 96 provided in the combustion chamber of the gas generator and forming a piston chamber 98.

The gas generator includes a pyrotechnic actuation initiator 100 suitable for being triggered in this embodiment by the first detection system 30, and designed to ignite a pyrotechnic charge in order to release gas into the piston chamber 98 for the purpose of moving the piston in the axial direction A.

The operation of the gas generator is inverted relative to the above-described embodiments.

The valve 90 is initially positioned in such a manner as to close the orifice 16 in the central portion 22 of the combustion chamber 14 and thus to define a limited gas flow section suitable for "fast" inflation of the airbag.

As stated above, the pyrotechnic initiator 28 is connected to the two detection systems 30 and 32 and the pyrotechnic actuation initiator 100 is connected solely to the first detection system 30 for detecting an imminent collision.

If the first detection system 30 detects an imminent collision, it triggers simultaneously both the pyrotechnic initiator 28 and the pyrotechnic actuation initiator 100. The pyrotechnic initiator 28 initiates combustion of the pyrotechnic charge 26 situated in the combustion chamber 14 and thus triggers inflation of the airbag 12. Simultaneously, the pyrotechnic actuation initiator 100 ignites the pyrotechnic charge situated in the piston chamber 98, thereby causing the piston 94 to move, and thus causing the valve 90 to move outwards from the gas generator 10 in the direction represented by arrow D. The orifice 16 formed in the central portion 22 is thus opened and the outlet gas flow section from the combustion chamber 14 is increased. In this way, it is possible to provide "slow" inflation of the airbag 12 in the event of a collision being detected in anticipated manner.

In the event of the first detection system 30 failing to operate, the second detection system 32 actuates the pyrotechnic initiator 28 and the valve 90 remains in its initial position closing the orifice 16, thereby ensuring that the airbag is inflated "fast".

Figure 5A:
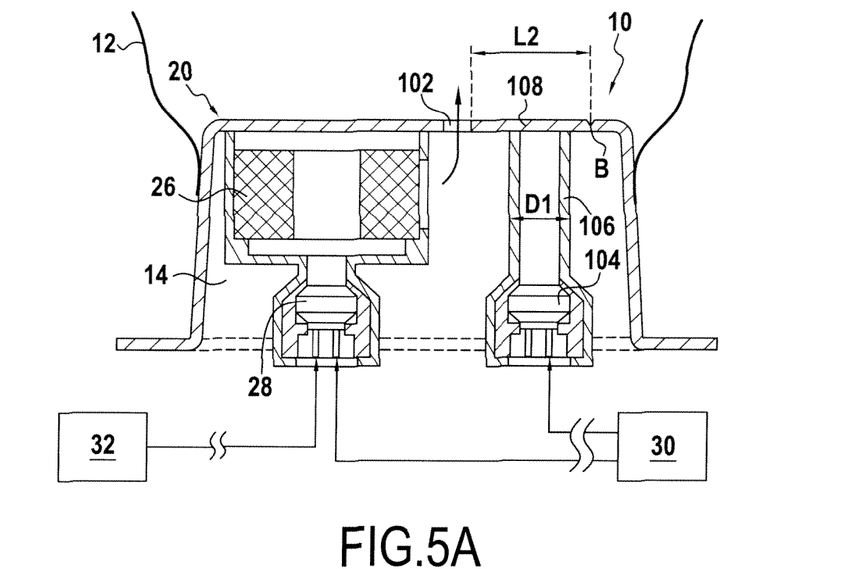
FIGS. 5A and 5B show a fifth embodiment of a gas generator of the present invention.
Figure 5B:
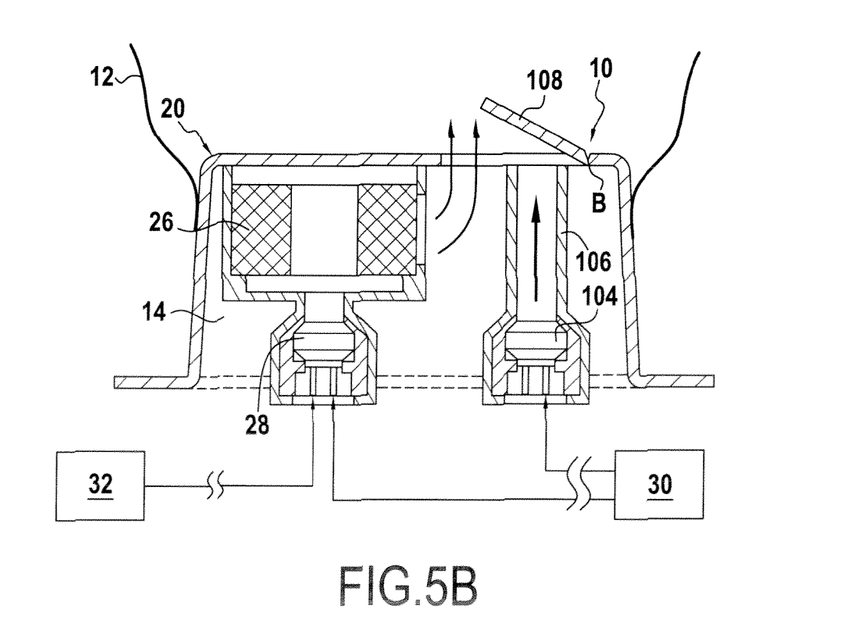

FIGS. 5A and 5B show a fifth embodiment of a gas generator 10 of the present invention.

As in the fourth embodiment, the gas generator 10 is arranged so that the gas flow section is arranged, by default, to provide "fast" inflation of the airbag 12.

FIG. 5A shows the gas generator 10 in its initial state. An orifice 102 is formed in the outer axial wall 20 of the combustion chamber 14. In the initial state, this orifice 102 is closed in part by a valve 108 that is suitable for pivoting by means of a hinge about an axis B that is perpendicular to the axis A of the combustion chamber. This hinge may be constituted merely by a cut formed in the outer end wall of the combustion chamber, thus giving the valve a certain amount of resistance against gas released in the combustion chamber 14.

The gas generator 10 still comprises a pyrotechnic initiator 28 connected to the first and second collision detection systems 30 and 32 and suitable for being actuated by that one of these two systems that operates first.

The gas generator 10 also has a pyrotechnic actuation initiator 104 connected to the first detection system 30 and surmounted by a cylindrical chimney 106 leading to the valve 108 of the outer axial end wall 20 of the combustion chamber 14. As shown in FIG. 5A, the width L2 of the valve is greater than the diameter D1 of the cylindrical chimney 106.

Under the effect of the gas released in the cylindrical chimney 106 by a pyrotechnic charge ignited by the pyrotechnic actuation initiator 104, the valve 108 is suitable for pivoting about the axis B outwards from the generator 10. Since the valve 108 is wider than the cylindrical chimney 106, the flow section for gas leaving the combustion chamber 14 is increased.

In the above-mentioned circumstance of the hinge of the valve 108 being merely a cut formed in the outer end wall 20 of the combustion chamber 14, the resistance imparted to the valve 108 is such that it lifts solely under the effect of the gas released in the chimney 106 as a result of the pyrotechnic actuation initiator 104 being triggered.

When the first detection system 30 detects that a collision is about to occur, it jointly actuates the pyrotechnic initiator 28 and the pyrotechnic actuation initiator 104, firstly to start inflation of the airbag 12 and secondly to cause the valve 108 to pivot under the effect of the gas released in the cylindrical chimney 106 in order to increase the gas flow section. In this way, the pressure inside the combustion chamber 14 is reduced, the outlet flow rate of the gas is reduced, and the airbag 12 is inflated "slowly".

In the event of the first detection system 30 failing to operate, the second detection system 32 actuates only the pyrotechnic initiator 28, which releases gas that escapes towards the airbag via the orifice 102 of section that is at its minimum, at that instant. The airbag is thus inflated "fast".

Figure 6A:
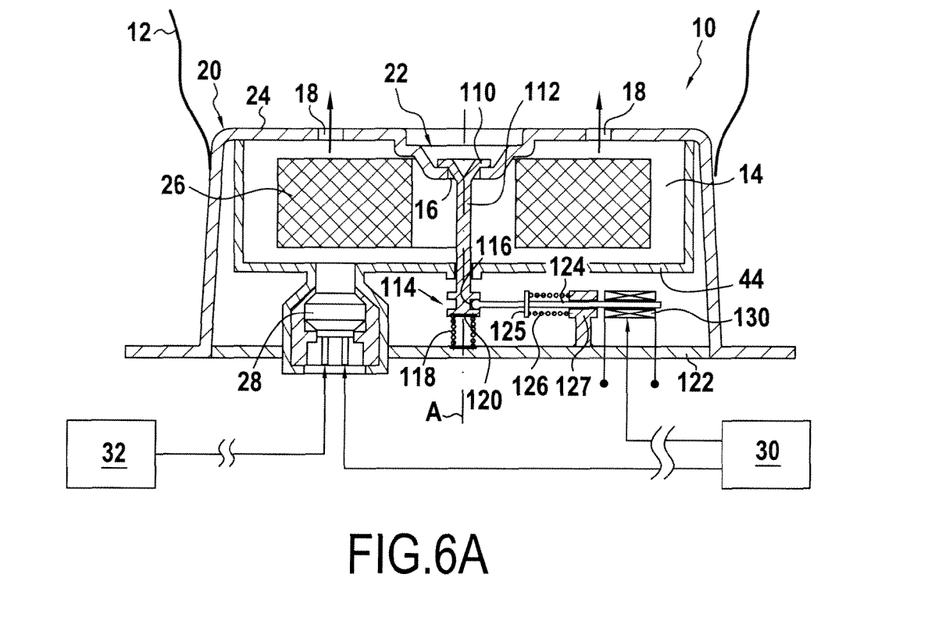
FIGS. 6A and 6B show a sixth embodiment of a gas generator of the present invention.
Figure 6B:
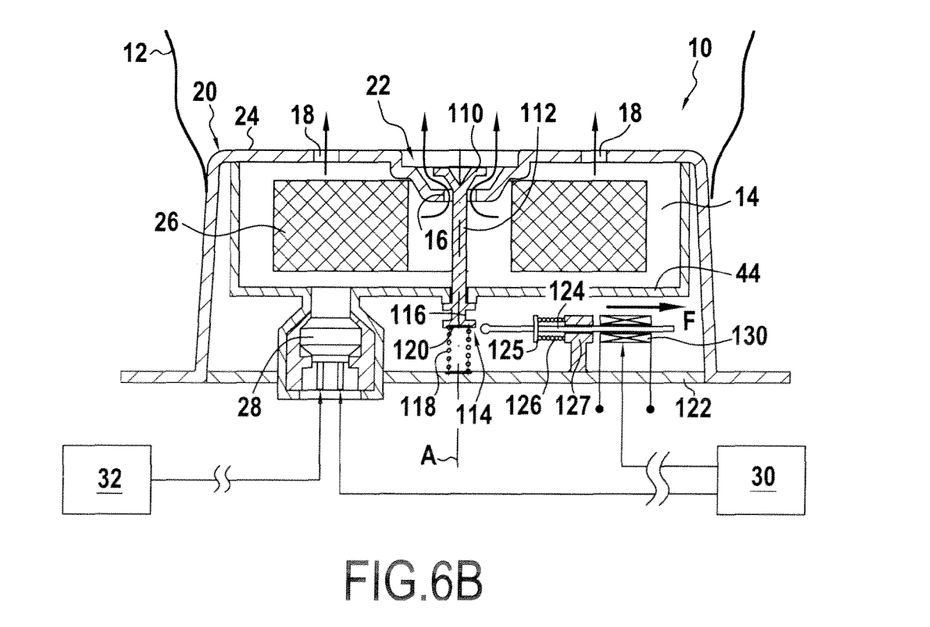

FIGS. 6A and 6B show a sixth embodiment of the invention.

In this embodiment, a gas flow orifice 16 provided in the central portion 22 of the combustion chamber 14 is closed in the initial state by a valve 110 bearing against the outside face of the outer end wall 20 of the combustion chamber 14. The valve 110 is connected to a rod 112 that passes through the combustion chamber 14 and that is terminated at its opposite end situated outside the combustion chamber by a head 114 having an anchor housing 116 formed therein. In the example shown in FIGS. 6A and 6B, the anchor housing 116 is in the form of a circumferential groove.

The valve 110 is urged outwards from the gas generator 10 in the axial direction A by a compression spring 118 that bears against the inside end face 120 of the head 114 and also against a wall 122 of the gas generator 10 facing said inside end face 120.

When the gas generator 10 is in its initial state, as shown in FIG. 6A, the orifice 16 of the combustion chamber is closed by the valve 110. The valve 110 is held in this position against the return force of the spring 118 that urges it outwards, by means of an anchor rod 124 that extends perpendicularly to the rod 112 of the valve 110 and that is received in the initial state in the anchor housing 116 of the head 114.

The anchor rod 124 passes through a stationary support 127 provided in the gas generator 10. It also includes an abutment 125 co-operating with a return spring 126 bearing against the stationary support 127 and also against the abutment 125 in order to urge the anchor rod 124 into the anchor housing 116 of the head 114.

The anchor rod 124 is made of a magnetizable material, e.g. soft iron. As shown in FIG. 6A, it is surrounded by an electromagnetic coil 130 that is connected to the first detection system 30 that serves to detect an imminent collision.

Under the effect of an electric pulse, the electromagnetic coil 130 is suitable for driving the anchor rod radially outwards against the return force of the spring 126.

The assembly formed by the anchor rod 124 and the anchor housing 116 constitutes an electromagnetic trigger.

The gas generator 10 operates as follows: Initially, the valve 110 closes the orifice 16 of the combustion chamber. In this configuration, the gas flow section is equal to the sum of the sections of the orifices 18 formed in the peripheral portion 24 of the outer axial end wall 20. The gas generator 10 under such circumstances is adapted to detection of an actual collision that requires the airbag 12 to be inflated "fast".

The electromagnetic coil 130 is powered by a current generator connected to the first detection system 30 that is suitable for detecting an imminent collision. If the first detection system 30 operates, then the pyrotechnic initiator 28 is triggered in order to initiate combustion of the pyrotechnic charge 26, and simultaneously an electric pulse is sent to the electromagnetic coil 130. By magnetization, the electromagnetic coil 130 drives the anchor rod 124 in the radial direction represented by an arrow F in FIG. 6B. On moving radially, the anchor rod 124 disengages from the anchor housing 116, thereby releasing the valve 110 to move axially towards the outside of the gas generator 10 in the direction of axis A under drive from the spring 118. The stroke of the rod 112 is restrained by the head 114 coming into abutment against the inner axial end wall 44 of the combustion chamber 14. At that instant, the valve 110 is spaced apart from the orifice 16 of the combustion chamber 14 and the gas flow section is increased, such that the airbag 12 can be inflated "slowly".

It should be observed that in the three above-described embodiments corresponding to FIGS. 4A to 6B, once the generator 10 has been configured for "slow" inflation of the airbag 12 it is no longer possible, subsequently, to cause the airbag to inflate fast as a result of the second detection system operating. In these three embodiments, and when the first detection system 30 operates appropriately, the inflation of the airbag can take place only at the "slow" speed.

In a seventh embodiment that is close to the above-described sixth embodiment, the electromagnetic trigger of the sixth embodiment is replaced by a thermal fuse that is connected to an electric circuit. Like the rod in FIGS. 6A and 6B, the thermal fuse enables the rod 112 of the valve 110 to be held in its retracted position by being inserted in the anchor housing 116 of the head 114. In the event of an imminent impact being detected, the first detection system sends an electric pulse to the electric circuit, thereby causing the thermal fuse to heat and melt and thus releasing the rod 112 of the valve 110. Since the valve 110 is biased by an initially compressed spring 118, it is deployed instantly towards the outside of the gas generator 10 and releases the orifice 16 of the combustion chamber 14.

Figure 7A:
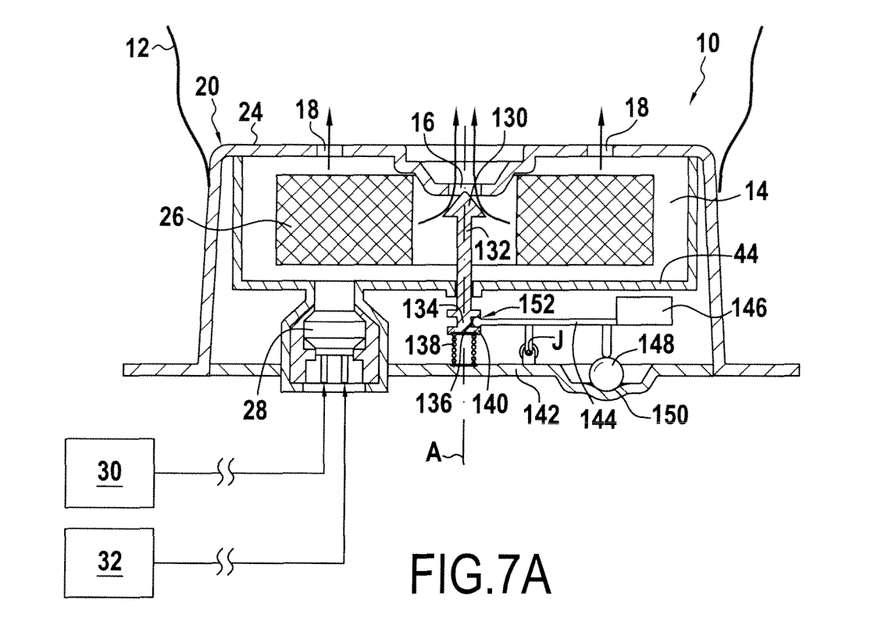
FIGS. 7A and 7B show an eighth embodiment of a gas generator of the present invention.
Figure 7B:
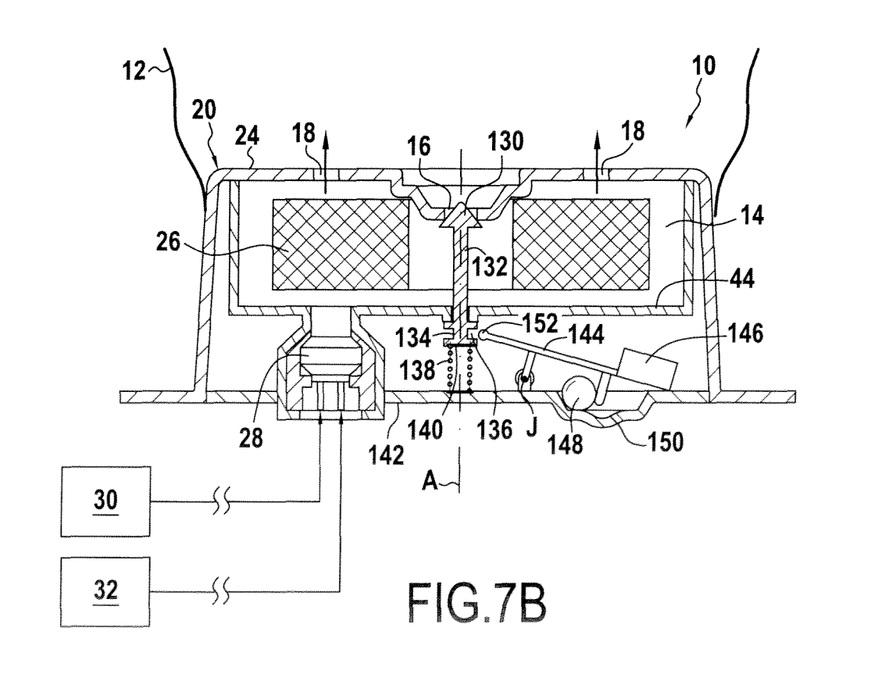

FIGS. 7A and 7B show an eighth embodiment of the gas generator of the present invention.

In the sixth embodiment shown in FIGS. 6A and 6B, the gas generator includes a valve 130 suitable for closing an orifice 16 formed in the outer axial end wall 20 of the combustion chamber 14. The valve is extended by a rod 132 that is itself terminated by a head 134 in which an anchor housing 136 is formed. As in the above-described sixth embodiment, the valve 130 is urged towards the outside of the gas generator 10 by a spring 138 that is initially compressed to bear against the inside end face 140 of the head 134 and against a support wall 142 of the gas generator 10 that faces said inside face 140.

As shown in FIG. 7A, the valve 130 in this example is in the form of a needle.

At rest, the valve 130 is held in a position in which the orifice 16 of the combustion chamber 14 is open. In this position, the gas generator 10 is adapted for "slow" inflation of the airbag, insofar as the flow section for gas leaving the combustion chamber 14 is at its maximum.

The valve 130 is held in position by an anchor rod 144 having one end inserted in an anchor housing 136 of the rod 134 of the valve 130. The anchor rod 144 is terminated by a weight 146 and it is supported by a ball 148 positioned in a recess 150 formed in the wall 142 of the gas generator 10. These elements constitute an inertial device that is activated as from a deceleration threshold.

In the event of an impact, under the effect of the inertia due to the violent deceleration of the vehicle, the ball 148 is dislodged from the recess 150 in which it was positioned. Under the effect of the weight 146 connected to the rod 144, the rod pivots about a pivot axis J, thereby releasing its end 152 from the anchor housing 136 provided in the head 134 of the rod 132.

Since the valve 130 is urged outwards from the gas generator in the axial direction A by the compression spring 138, it moves inside the combustion chamber until it closes the orifice 16. In this state, the gas flow section is reduced, the pressure inside the combustion chamber is increased, and consequently the outlet flow rate of gas and the inflation of the airbag take place fast.

As shown in the figures, the pyrotechnic initiator 28 is connected to two detection systems 30 and 32. When the first detection system 30 operates, inflation may begin with a "slow", first stage. Thereafter, when the collision occurs, the inertial device releases the valve 130 and inflation continues more quickly. When the first detection system 30 does not operate, the second detection system 32 will trigger the pyrotechnic initiator 28 at the moment of the impact and the inertial device serves to set the gas generator so that the airbag can be inflated fast enough.

The invention claimed is:

1. A pyrotechnic gas generator for a car airbag the generator including a pyrotechnic charge and being characterized in that it further comprises:
   a pyrotechnic initiator situated in a combustion chamber and suitable for being actuated by a first detection system for detecting an imminent collision state, and/or by a second detection system for detecting an actual collision state;
   a gas flow passage between said combustion chamber and said airbag; and
   at least one valve suitable for being moved from a first position in which it defines a first flow section to a second position in which it defines a second flow section greater than said first flow section, or vice versa, said valve being arranged in such a manner as to define the greater flow section if the pyrotechnic initiator is actuated by the first detection system.

2. A pyrotechnic gas generator according to claim 1, wherein the gas flow passage is constituted by at least two orifices formed in the combustion chamber said valve being suitable for closing at least one of said orifices.

3. A pyrotechnic gas generator according to claim 1, wherein said valve is suitable for being moved under the effect of the gas released by a pyrotechnic charge ignited by a pyrotechnic actuation initiator.

4. A pyrotechnic gas generator according to claim 1, wherein said valve is a slider suitable for being moved along a rectilinear path.

5. A pyrotechnic gas generator according to claim 1, wherein the valve is a turnable slider having at least one opening suitable for being positioned in register with at least one orifice of the combustion chamber and at least one guide ramp, said turnable slider being suitable for being moved under the effect of a piston actuated by the gas released by a pyrotechnic charge ignited by the pyrotechnic actuation initiator and co-operating with said guide ramp.

6. A pyrotechnic gas generator according to claims 1, wherein said valve is in the form of a valve needle.

7. A pyrotechnic gas generator according to claim 1, wherein said valve is biased by a spring that is initially stressed and that is released by an inertial device that is activated as from a detection threshold.

8. A pyrotechnic gas generator according to claim 1, wherein said valve is biased by a spring that is initially stressed and that is released by a thermal fuse connected to an electric circuit.

9. A pyrotechnic gas generator according to claim 1, wherein said valve is biased by a spring that is initially stressed and that is released by an electromagnetic trigger.

10. The combination of a car airbag and a pyrotechnic gas generator according to claim 1, having said airbag attached thereto.

11. A safety system for inflating a car airbag, the system being characterized in that it comprises:
    a pyrotechnic gas generator according to claim 1;
    a first detection system for detecting an imminent collision state; and
    a second detection system for detecting an actual collision state.

* * * * *